United States Patent
Abraham et al.

(10) Patent No.: US 9,930,147 B2
(45) Date of Patent: Mar. 27, 2018

(54) METHODS AND SYSTEMS FOR DUAL CHANNEL INFORMATION

(71) Applicant: QUALCOMM Incorporated, San Diego, CA (US)

(72) Inventors: Santosh Paul Abraham, San Diego, CA (US); Simone Merlin, Solana Beach, CA (US); George Cherian, San Diego, CA (US); Gwendolyn Denise Barriac, Encinitas, CA (US); Rahul Tandra, San Diego, CA (US); Bin Tian, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 77 days.

(21) Appl. No.: 14/726,348

(22) Filed: May 29, 2015

(65) Prior Publication Data
US 2015/0350382 A1    Dec. 3, 2015

Related U.S. Application Data

(60) Provisional application No. 62/005,867, filed on May 30, 2014.

(51) Int. Cl.
*H04L 29/06* (2006.01)
*H04L 5/00* (2006.01)
(Continued)

(52) U.S. Cl.
CPC ........... *H04L 69/14* (2013.01); *H04L 5/0092* (2013.01); *H04W 88/10* (2013.01); *H04L 5/1423* (2013.01)

(58) Field of Classification Search
CPC ..... H04W 88/10; H04L 5/0092; H04L 5/1423
See application file for complete search history.

(56) References Cited

U.S. PATENT DOCUMENTS 9,844,076 B1 * 12/2017 Liu ................... H04W 74/0816
2009/0080388 A1 * 3/2009 Rohfleisch ............. H04B 7/024
370/338

(Continued)

OTHER PUBLICATIONS

Wi-Fi Capacity Analysis for 802.11ac and 802.11n: Theory & Practice; By Timo Vanhatupa, Ph.D. Senior Research Scientist at Ekahau; 2013 Ekahau Wi-Fi Design White Paper.*

*Primary Examiner* — Hassan Kizou
*Assistant Examiner* — Deepa Belur
(74) *Attorney, Agent, or Firm* — Knobbe, Martens, Olson & Bear LLP

(57) ABSTRACT

An 802.11ac access point (AP) may be capable of communicating with both 802.11n (on 40 MHz band) and 802.11ac devices (on 80 MHz band). While the 802.11ac AP is communicated with 802.11n devices on 40 MHz band, the remaining 40 MHz band is wasted because the 802.11n devices are not capable of communicating on this band. The AP may operate as if it is two virtual APs, one capable of communicating with 802.11n devices on a first primary and a first secondary channels (basic service set 1—BSS1) and the second communicating with 802.11ac devices on a second primary and a second secondary channels (BSS2). Individual beacons may be sent for BSS1 and BSS2. The transmissions on BSS2 may be performed simultaneously with transmissions on BSS1. However, transmission on one channel and receiving on the second channel cannot happen simultaneously.

18 Claims, 6 Drawing Sheets

(51) Int. Cl.
*H04W 88/10* (2009.01)
*H04L 5/14* (2006.01)

(56) References Cited

U.S. PATENT DOCUMENTS

| | | | | |
|---|---|---|---|---|
| 2011/0013564 | A1* | 1/2011 | Zou | H04W 48/14 |
| | | | | 370/328 |
| 2012/0052900 | A1* | 3/2012 | Liu | H04W 28/0205 |
| | | | | 455/515 |
| 2012/0263086 | A1* | 10/2012 | Liu | H04W 52/0216 |
| | | | | 370/311 |
| 2012/0294246 | A1* | 11/2012 | Cariou | H04W 12/06 |
| | | | | 370/329 |
| 2013/0265907 | A1* | 10/2013 | Kim | H04W 88/06 |
| | | | | 370/254 |
| 2014/0112273 | A1* | 4/2014 | Aboul-Magd | H04L 5/0058 |
| | | | | 370/329 |
| 2014/0146716 | A1* | 5/2014 | Chen | H04L 5/16 |
| | | | | 370/277 |
| 2015/0078354 | A1* | 3/2015 | Chen | H04W 72/0486 |
| | | | | 370/336 |
| 2015/0333894 | A1* | 11/2015 | Wang | H04L 5/0073 |
| | | | | 370/329 |
| 2015/0373685 | A1* | 12/2015 | Seok | H04W 74/002 |
| | | | | 370/329 |
| 2016/0066349 | A1* | 3/2016 | Seok | H04W 24/02 |
| | | | | 370/338 |
| 2016/0095069 | A1* | 3/2016 | Noh | H04W 52/146 |
| | | | | 455/452.1 |
| 2016/0249357 | A1* | 8/2016 | Green | H04W 24/08 |
| 2017/0195991 | A1* | 7/2017 | Ahn | H04W 72/005 |

* cited by examiner

METHODS AND SYSTEMS FOR DUAL CHANNEL INFORMATION

CROSS REFERENCE TO RELATED APPLICATIONS

This Application claims the benefit of U.S. Provisional Application No. 62/005,867, filed May 30, 2014, and entitled "DUAL PRIMARY ACCESS POINT CONFIGURATION" and assigned to the assignee hereof. The disclosure of this prior application is considered part of this application, and is hereby incorporated by reference in its entirety.

BACKGROUND

Field

The present application relates generally to wireless network communications, and, more specifically, to systems, methods, and devices for communicating between wireless devices without wasting available bandwidth when one or more of the wireless devices can operate on a limited portion of the available bandwidth.

Description of the Related Art

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

One or more devices in a wireless network may be capable of only operating on a limited band of the available bandwidth provided by the wireless network. For example, a wireless device may include hardware or software allowing the wireless device to operate as one of an 802.11n or 802.11ac device. 802.11n devices may be limited to operating on only 40 MHz channels, while 802.11ac devices may be capable of operating on 80 MHz channels. Similarly, an 802.11n access point may be limited to communicating on only 40 MHz channels, while 802.11ac access points may be capable of communicating on 80 MHz channels with 802.11ac wireless devices while being required by wireless standards to be backwards compatible with 802.11n wireless devices and capable of operating on 40 MHz channels. Thus, a mixture of 802.11n and 802.11ac wireless devices may be associated with the same 802.11ac access point at a given moment. However, the limited bandwidth capabilities of the 802.11n wireless devices may result in wasted bandwidth when the 802.11ac access point is communicating with 802.11n wireless devices. Thus, improved systems, methods, and devices for simultaneously communicating with 802.11n and 802.11ac wireless devices are desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description," one will understand how the features of the various aspects of this invention provide advantages that include improved communications between access points and stations in a wireless network.

One aspect of this disclosure provides an apparatus for wireless communication, the apparatus comprising a processing system. The processing system is configured to select a first primary channel and a second primary channel from a plurality of channels, the first primary channel being associated with a first communication protocol and the second primary channel being associated with a second communication protocol, configure first data based on the first communication protocol, and configure second data based on the second communication protocol. The apparatus further comprises an interface configured to provide the first data for transmission to the first device and the second data for transmission to the second device, simultaneously.

Another aspect disclosed is a method for wireless communication, the method comprising selecting a first primary channel and a second primary channel from a plurality of channels, the first primary channel being associated with a first communication protocol and the second primary channel being associated with a second communication protocol, transmitting first data to a first device based on the first communication protocol on at least the first primary channel, and transmitting second data to a second device based on the second communication protocol on at least the second primary channel, wherein the first data and the second data are simultaneously transmitted.

Another aspect disclosed is an apparatus for wireless communication, the apparatus comprising means for selecting a first primary channel and a second primary channel from a plurality of channels, the first primary channel being associated with a first communication protocol and the second primary channel being associated with a second communication protocol, means for transmitting first data to a first device based on the first communication protocol on at least the first primary channel, and means for transmitting second data to a second device based on the second communication protocol on at least the second primary channel, wherein the first data and the second data are simultaneously transmitted.

An additional aspect disclosed is a wireless access point for wireless communication comprising at least one antenna, a processing system, and an interface. The processing system is configured to select a first primary channel and a second primary channel from a plurality of channels, the first primary channel being associated with a first communication protocol and the second primary channel being associated with a second communication protocol, configure first data based on the first communication protocol, and configure second data based on the second communication protocol. The interface is configured to provide the first data for transmission to the first device and the second data for transmission to the second device, simultaneously via the at least one antenna.

Another aspect disclosed is a computer program product comprising a computer readable storage medium encoded thereon with instructions that when executed cause an apparatus to perform a method of wireless communication. The method comprises selecting a first primary channel and a second primary channel from a plurality of channels, the first primary channel being associated with a first communication protocol and the second primary channel being associated with a second communication protocol, transmitting first data to a first device based on the first communication protocol on at least the first primary channel, and transmitting second data to a second device on the second communication protocol on at least the second primary channel, wherein the first data and the second data are simultaneously transmitted.

BRIEF DESCRIPTION OF THE DRAWINGS

The above-mentioned aspects, as well as other features, aspects, and advantages of the present technology will now be described in connection with various aspects, with reference to the accompanying drawings. The illustrated aspects, however, are merely examples and are not intended to be limiting. Throughout the drawings, similar symbols typically identify similar components, unless context dictates otherwise. Note that the relative dimensions of the following figures may not be drawn to scale.

DETAILED DESCRIPTION

Figure 1:
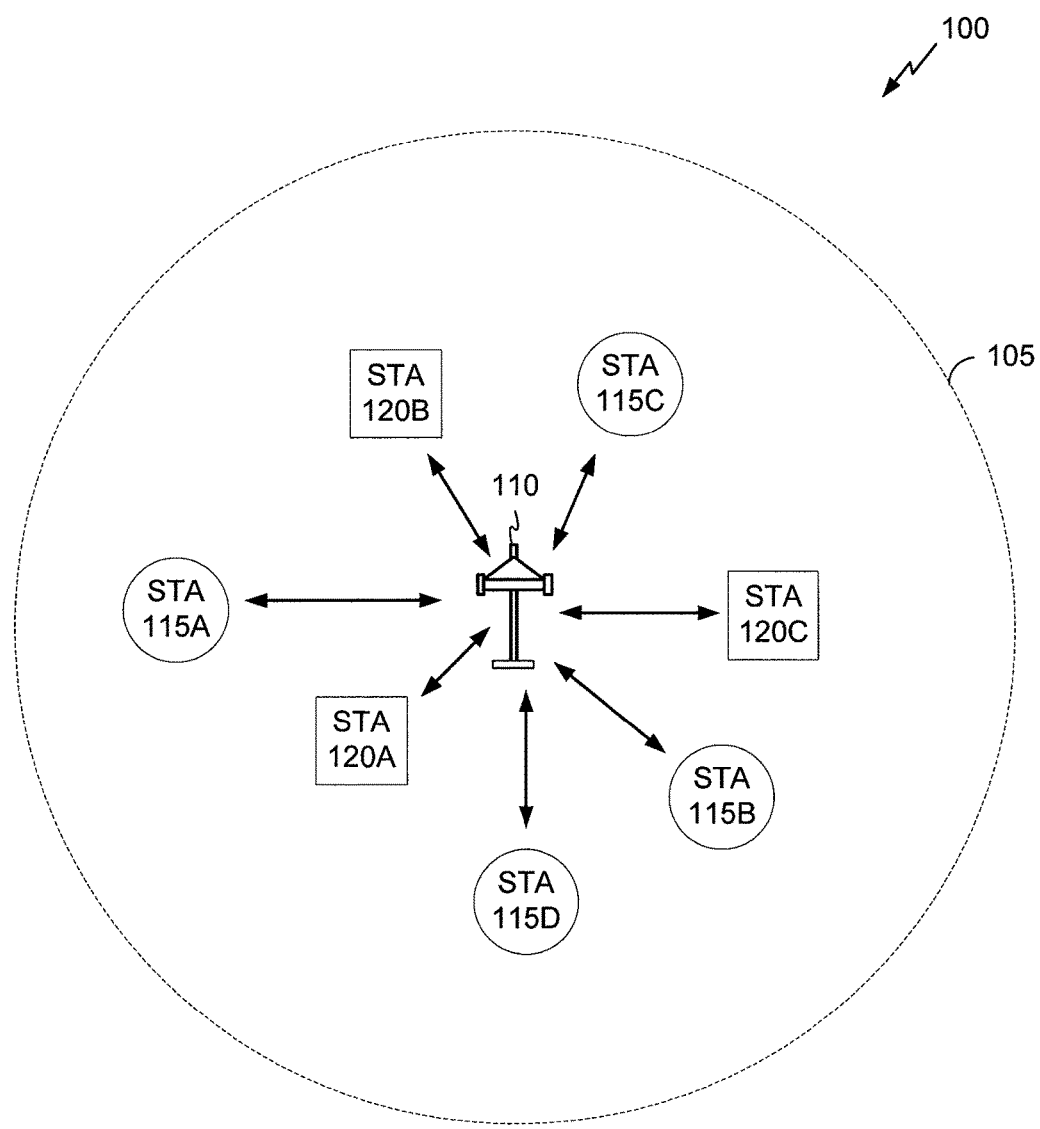
FIG. 1 illustrates one possible organization of a wireless network system with a wireless network, an access point, and multiple wireless access terminals.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals may be transmitted according to a high-efficiency 802.11 protocol using orthogonal frequency-division multiplexing (OFDM), direct-sequence spread spectrum (DSSS) communications, a combination of OFDM and DSSS communications, or other schemes. Implementations of the high-efficiency 802.11 protocol may be used for Internet access, sensors, metering, smart grid networks, or other wireless applications. Advantageously, aspects of certain devices implementing the high-efficiency 802.11 protocol using the techniques disclosed herein may include allowing for increased peer-to-peer services (e.g., Miracast, Wi-Fi Direct Services, Social Wi-Fi, etc.) in the same area, supporting increased per-user minimum throughput requirements, supporting more users, providing improved outdoor coverage and robustness, and/or consuming less power than devices implementing other wireless protocols.

In some implementations, a WLAN includes various devices which are the components that access the wireless network. For example, there may be two types of devices: access points ("APs") and clients (also referred to as stations, or "STAs"). In general, an AP may serve as a hub or base station for the WLAN and an STA serves as a user of the WLAN. For example, an STA may be a laptop computer, a personal digital assistant (PDA), a mobile phone, etc. In an example, an STA connects to an AP via a Wi-Fi (e.g., IEEE 802.11 protocol) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

A wireless node may comprise an access terminal ("AT") or STA, an AP or a relay-capable wireless device having at least one of a STA or AP operation, i.e., a wireless node may have AT or STA operation, AP operation, or both AT/STA and AP operations.

As discussed above, certain of the devices described herein may implement a high-efficiency 802.11 standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications. Although various systems, methods, and apparatuses are described herein with respect to a high-efficiency 802.11 standard, for example, a person having ordinary skill in the art will appreciate that the present disclosure is applicable to other wireless communication standards such as, for example, 802.11ah.

Referring to FIG. 1, an illustrative aspect of a wireless communication system with an access point and its corresponding coverage area (e.g., basic service area (BSA)) and a plurality of wireless access terminals are depicted and generally designated 100. Access point 110 may generate a basic service area 105 that represents the general coverage area of the access point 110. As shown, the access point 110 may be located at the center of the basic service area 105. The wireless network also comprises a plurality of wireless access terminals 115A-115D and wireless access terminals 120A-120C, which may be generally referred to below as wireless access terminals 115 and 120, respectively.

As depicted, the wireless communication system may be capable of wireless communications, for example, pursuant to an 802.11ac standard. Devices capable of 802.11ac communications may be capable of operating on both 40 MHz and 80 MHz channels or bands. The access point 110 may be configured to operate pursuant to the 802.11ac standards, and accordingly, may be capable of communicating with the wireless access terminals 115 and 120 depicted in FIG. 1 and is generally referred to below as access point 110. The basic service area 105 may represent the area within which access point 110 may be able to communicate with and associate with wireless access terminals 115A-D and 120A-C. The size of the BSA 105 may be based at least on the power of the access point 110 or the environment in which the access point 110 is operating. Wireless access terminals 115A-115D may represent 802.11n wireless access terminals capable of communicating on 40 MHz channels and are generally referred to below as wireless access terminals 115. Wireless access terminals 120A-120C may represent 802.11ac wireless access terminals capable of communicating on 80 MHz channels and are generally referred to below as wireless access terminals 120.

In some aspects, the access point 110 may act as a base station and may provide wireless communication coverage in the basic service area (BSA) 105. The access point 110 and the wireless access terminals 115 and 120 associated with the access point 110 and that use the access point 110 for communication may be referred to as a basic service set (BSS).

In some aspects, the 40 MHz and 80 MHz channels for the 802.11n and 802.11ac communications, respectively, may be made up of adjacent 20 MHz channels. Accordingly, the 40 MHz channel of the 802.11n band of communications may comprise two adjacent 20 MHz channels, while the 80 MHz channel of the 802.11ac band of communications may comprise four adjacent 20 MHz channels.

The access point 110 may desire to communicate with both the 802.11n wireless access terminals 115A-115D and 802.11ac wireless access terminals 120A-120C. Accordingly, the 802.11ac capable access point 110 may enjoy four 20 MHz channels for communication. In some aspects, the access point 110 may divide the four 20 MHz channels into two pairs of channels and configure one channel in each pair to be a primary channel and the other channel in each pair of channels to be a secondary channel. The access point 110 may then designate one of the two primary channels as the primary channel for communications with 802.11n devices and may designate the second of the two primary channels as the primary channel for communication with the 802.11ac devices. Thus, one pair of 20 MHz channels may comprise the primary and secondary channels for communication on the combined 40 MHz channel with 802.11n wireless access terminals 115A-115D, while the other pair of 20 MHz channels may comprise the primary and secondary channels for communication on the other 40 MHz channel with 802.11ac wireless access terminals 120A-120C. The pairs of primary and secondary channels for both wireless bands may be adjacent to each other, i.e., the primary and secondary channels for the 40 MHz channel may be adjacent with each other (e.g., channels 1 and 2 or channels 3 and 4) while the primary and secondary channels for the 80 MHz channel are adjacent with each other (e.g., channels 3 and 4 when the 40 MHz channels are 1 and 2, or channels 1 and 2 when the 40 MHz channels are 3 and 4). Accordingly, channels 2 and 3 may not comprise a pairing of channels as presently described.

The primary channels for the 802.11n and 802.11ac bands may be of special importance; any communication taking place on either the 802.11n and 802.11ac bands may utilize at least the primary channels. Accordingly, the device that controls the primary channel of the 802.11n and/or the 802.11ac band controls the communication across the band. Thus, if access point 110 controls the primary channel on the 802.11n band, then the access point 110 controls the communications on both the 802.11n and 802.11ac bands.

Figure 2:
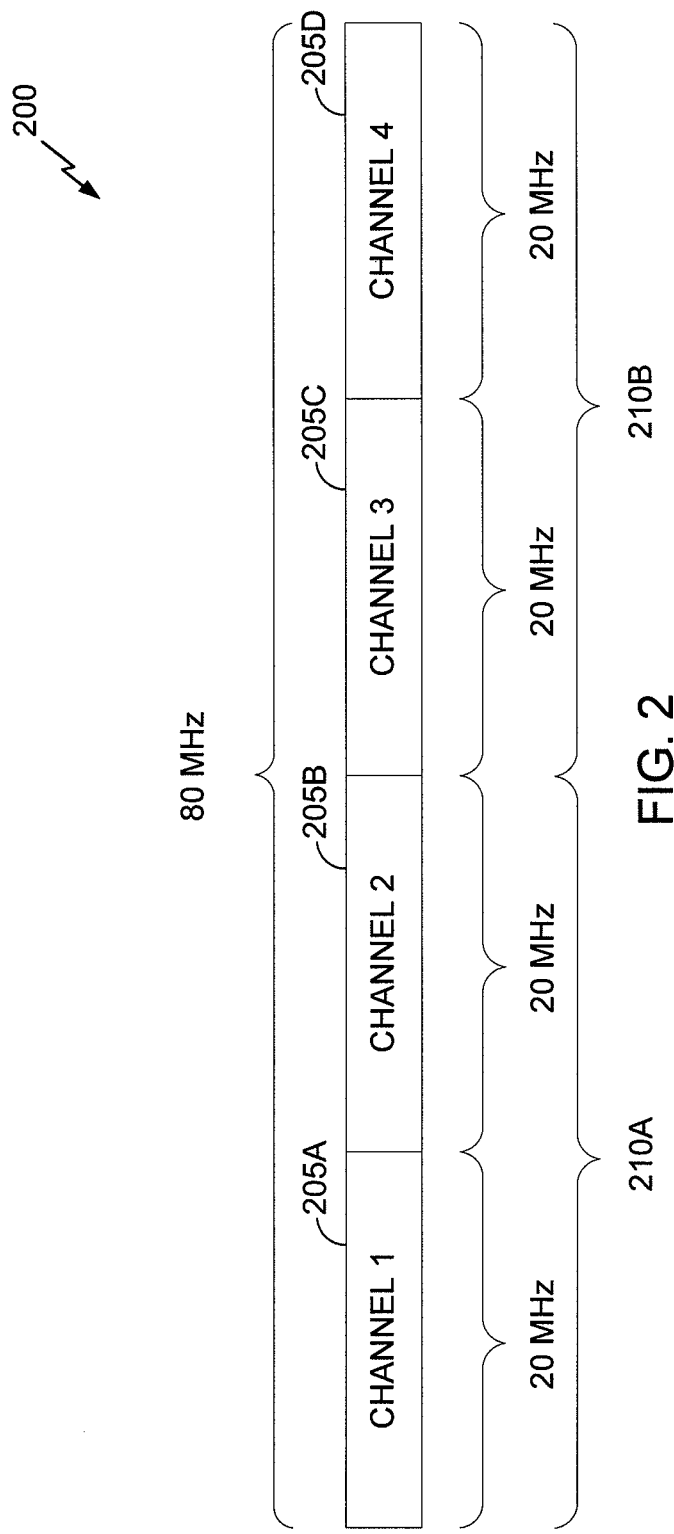
FIG. 2 shows an aspect of an 80 MHz channel comprising four adjacent 20 MHz channels which may comprise the communication channel of the access point and wireless network of FIG. 1.

Referring to FIG. 2, an 80 MHz channel is depicted as being subdivided into four 20 MHz channels, labeled Channels 1-4 and generally designated 200. The 80 MHz wide channel 200 may be divided into four 20 MHz wide channels 205A, 205B, 205C, and 205D, consecutively.

As discussed above, the access point 110 may be configured to act as two virtual access points, one each for the 802.11n and 802.11ac. Referring to FIG. 2, the 802.11n band may comprise any pairs of channels 1 and 2 and channels 3 and 4, so long as the channels are adjacent. The 802.11ac band may comprise the other of the pairs of channels 1 and 2 and channels 3 and 4. For example, if the 802.11n band is established on channels 1 and 2, then the 802.11ac band may be established on channels 3 and 4; accordingly, if the 802.11ac band is established on channels 1 and 2, then the 802.11n band may be established on channels 3 and 4.

When communicating to only an 802.11n device, only two adjacent channels of the four depicted channels may be utilized. As discussed above, when communicating with wireless access terminal 115*a*, access point 110 may utilize channels 1 and 2 or channels 3 and 4. To not waste the remaining 40 MHz of the 80 MHz band, the access point may establish 802.11ac communications on the remaining 40 MHz of the 80 MHz band.

Additionally, as shown, basic service set 1 (BSS1) 210A may comprise channels 1 and 2 while basic service set 2 (BSS2) 210B may comprise channels 3 and 4. In some aspects, BSS1 210A and BSS2 210B may be switched with regards to what channels they comprise, and are generally referred to below as BSS 210.

Accordingly, the 80 MHz capable 802.11ac access point 110 may operate as two "virtual" access points, one of the virtual access points operating on one 40 MHz "sub-band" of the original 80 MHz band available to the access point 110, and the other virtual access point operating on the second 40 MHz "sub-band" of the original 80 MHz band. Thus, the access point 110 may now be able to communicate with both 802.11n devices 115 and 802.11ac 120 devices simultaneously, for example the communications with the 802.11n devices 115A-115D occurring on channel 1 205A and channel 2 205B and the communications with the 802.11ac devices 120A-120C occurring on channel 3 205C and channel 4 205D.

When configured to generate a first pair of 20 MHz channels as first primary and secondary channels on the 40 MHz band, the access point 110 may advertise a first base service set (BSS1) 210A to all devices capable of communicating on the 802.11n 40 MHz band. Similarly, when configured to generate a second pair of 20 MHz channels as second primary and secondary channels on the 802.11ac 80 MHz band, and may advertise a second base service set (BSS2) 210B. The advertisement of the two BSSs 210 may include indications as to the capabilities of each BSS 210. In some aspects, the BSS1 210A may not support associations with 802.11ac capable wireless access terminals 120, while the BSS2 210B may not support associations with 802.11n capable wireless access terminals 115. Thus, the BSS1 210A may comprise channel 1 as the primary channel for communications with 802.11n devices and channel 2 as the secondary channel for communications with 802.11n devices, while the BSS2 210B may comprise channel 3 as the primary channel for communications with 802.11ac devices and channel 2 as the secondary channel for communications with 802.11ac devices. In some aspects, the channels may be switched between the BSS1 210A and BSS2 210B (i.e., BSS1 210A comprises channels 3 and 4 while BSS2 210B comprises channels 1 and 2). In some aspects, if an 802.11n wireless access terminal 115 attempts to associate with the 802.11ac "virtual access point" BSS2 210B, then the 802.11n wireless access terminal 115 may be rejected and not be allowed to associate with the BSS2 210B. Similarly, in some aspects, if an 802.11ac wireless access terminal 120 attempts to associate with the 802.11n "virtual access point" BSS1 210A, then the 802.11ac wireless access terminal 120 may be rejected and not be allowed to associate with the BSS1 210A.

In some aspects, the access point 110 may generate one or more beacons to distribute to the one or more wireless access terminals 115 on the BSS1 210A and to the one or more wireless access terminals 120 on the BSS2 210B. In some aspects, the access point 110 may generate individual beacons for each of BSS1 210A and BSS2 210B, and transmit the beacons for each BSS1 210A and BSS2 210B using the separate primary channels for each of the BSSs 210. However, the beacons may be transmitted simultaneously on the BSSs 210. In some aspects, the beacons generated and transmitted for each of the BSSs 210 may be restricted to the 20 MHz primary channel of one or more of the BSSs 210. In some other aspects, the beacons may be transmitted on both the primary and secondary channels for each of the BSSs 210.

In an aspect, the access point 110 may transmit a down-link 802.11n to a wireless access terminal 115 on BSS1 210A while simultaneously transmitting a down-link 40 MHz transmission to a wireless access terminal 120 on BSS2 210B. However, the channel access for simultaneous down-link transmissions on BSS1 210A and BSS2 210B may be based at least in part on a contention backoff count down scheme. In the contention backoff countdown scheme, the primary channel of the 802.11n BSS1 210A may be the basis for the backoff countdown. The backoff countdown may utilize a priority interframe spacing (PIFS) time before the countdown is complete on the BSS1 210A to determine if the BSS2 210B is idle. For example, a PIFS time before the countdown on BSS 1 210A is complete, the access point 110 may check the CCA on the BSS2 210B. If the BSS2 210B is indicated as being idle, then a 40 MHz transmission destined for a 802.11ac device on BSS2 210B may be added to be transmitted simultaneously with the BSS1 210A down-link transmission on the adjacent BSS2 210B. If the BSS1 210A is not indicated as being idle, then the 40 MHz transmission may not be added to the BSS1 210A down-link transmission. For example, if BSS2 210B is clear for the PIFS, for example ~25 ms before the count down on BSS1 completes, then the access point 110 generates and prepares the 40 MHz transmission on BSS2 210B for simultaneous transmission with the BSS1 210 transmission.

In some aspects, acknowledgements acknowledging receipt of transmissions by 802.11n and 802.11ac devices on BSS1 210A and BSS2 210B may be transmitted to the access point 110. These acknowledgements may be used to acknowledge that the simultaneous transmissions discussed above were received appropriately. In some aspects, the acknowledgement scheme may be varied based at least partly on the receive capabilities of the access point 110. In some aspects, simultaneous transmission and reception of acknowledgements and/or any data transmissions on the BSS1 210A and BSS2 210B may not be available. In those aspects, access point 110 may need to plan or schedule its transmissions and receptions so as to not receive acknowledgements at the same time as transmitting other transmission. In such aspects, if the access point 110 can receive simultaneously on the separate channels for BSS1 210A and BSS2 210B from various 802.11n and 802.11ac devices, the access point may implement "padding" to ensure that the length of the physical layer convergence procedure (PLCP) protocol data units (PPDUs) on the two BSS1 and BSS2 are identical and that the beacon acknowledgement responses can be received SIFS after the PPDUs. For example, the access point 110 may "pad" transmissions on the BSS1 210A and BSS2 210B so that the transmissions on each respective channel end at the same time. When the transmissions on each respective channel BSS1 210A and BSS2

210B end at the same time, the access point 110 need not be concerned with having the receiving and transmitting functions overlap, because the transmissions complete together, and thus the receipt of acknowledgements cannot overlap with transmissions.

If the access point 110 cannot receive simultaneously, the access point 110 marks the BSS2 transmissions as "no ACK," meaning that the one or more 802.11ac devices 120 will not transmit acknowledgements after receipt of transmissions on the BSS2 210B. Then, the access point 110 may submit a beacon acknowledge request (BAR) to retrieve acknowledgements from the respective devices at a later moment in time.

Figure 3:
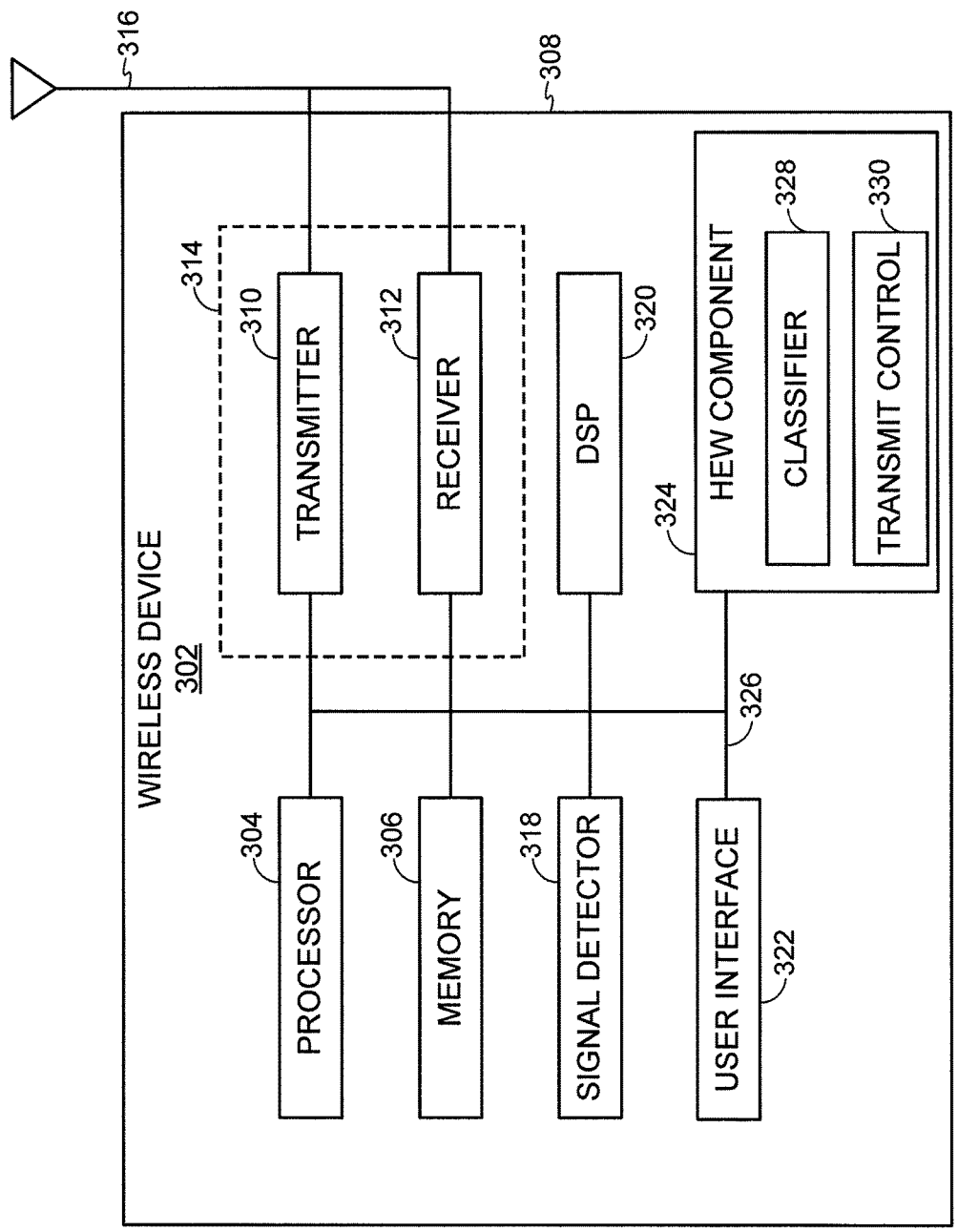
FIG. 3 shows an aspect of a device which may comprise one or more of the devices of FIG. 1.

FIG. 3 shows an exemplary functional block diagram of a wireless device 302 that may be employed within the wireless communication system 100. The wireless device 302 is an example of a device that may be configured to implement the various methods described herein. For example, the wireless device 302 may comprise the access point 120, one of the wireless access terminal 115 and/or one of the wireless access terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), may provide instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The processor 304 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein. Accordingly, the processing system may include, e.g., hardware, firmware, and software, or any combination therein.

The wireless device 302 may also include a housing 308 that may include a transmitter 310 and/or a receiver 312 to allow transmission and reception of data between the wireless device 302 and a remote location. The transmitter 310 and receiver 312 may be combined into a transceiver 314. An antenna 316 may be attached to the housing 308 and electrically coupled to the transceiver 314. The wireless device 302 may also include (not shown) multiple transmitters, multiple receivers, multiple transceivers, and/or multiple antennas.

The transmitter 310 can be configured to wirelessly transmit messages, which can be referred to as "paging messages" that are configured to indicate to wireless devices whether or not the wireless devices need to wake up from a "doze" state and enter an "awake" state as discussed below. For example, the transmitter 310 can be configured to transmit paging messages generated by the processor 304, discussed above. When the wireless device 302 is implemented or used as a wireless access terminal 115 or 120, the processor 304 can be configured to process paging messages. When the wireless device 302 is implemented or used as an access point 110, the processor 304 can also be configured to generate paging messages and data for transmission to the wireless access terminals 115 and 120.

The receiver 312 can be configured to wirelessly receive paging messages. When the wireless device 302 is implemented or used as a wireless access terminal 115 and 120, the transmitter 310 can be configured to transmit requests for data in response to the paging messages. For example, the wireless device 302 can be configured to transmit a Power-Saving Poll (PS-Poll) as will be described herein with respect to FIG. 3. When the wireless device 302 is implemented or used as an access point 115, the transmitter 310 can be further configured to transmit data to the one or more wireless access terminal 115 and 120. When the wireless device 302 is implemented or used as a wireless access terminal 115 and 120, the transmitter 310 can be configured to transmit an acknowledgment to the data received from the access point 110. When the wireless device 302 is implemented or used as an access point 110, the receiver 312 can be configured to receive an acknowledgment that the data was received by the wireless access terminals 115 and 120.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals. The DSP 320 may be configured to generate a packet for transmission. In some aspects, the packet may comprise a physical layer data unit (PPDU).

The wireless device 302 may further comprise a user interface 322 in some aspects. The user interface 322 may comprise a keypad, a microphone, a speaker, and/or a display. The user interface 322 may include any element or component that conveys information to a user of the wireless device 302 and/or receives input from the user.

The wireless devices 302 may further comprise a high-efficiency wireless component 324 in some aspects. The high-efficiency wireless component 324 may include a classifier unit 328 and a transmit control unit 330. As described herein, the high-efficiency wireless component 324 may enable APs and/or STAs to use a modified mechanism that minimizes the inefficiencies of the CSMA mechanism (e.g., enables concurrent communications over the medium in situations in which interference would not occur).

The modified mechanism may be implemented by the classifier unit 328 and the transmit control unit 330. In an aspect, the classifier unit 328 determines which devices are in a state or condition such that they can communicate concurrently with other devices and which devices are in a state or condition such that they cannot communicate concurrently with other devices. In an aspect, the transmit control unit 330 controls the behavior of devices. For example, the transmit control unit 330 may allow certain devices to transmit concurrently on the same medium and allow other devices to transmit using a spatial multiplexing or frequency domain multiplexing technique. The transmit control unit 330 may control the behavior of devices based on the determinations made by the classifier unit 328.

The various components of the wireless device 302 may be coupled together by a bus system 326. The bus system 326 may include a data bus, for example, as well as a power bus, a control signal bus, and a status signal bus in addition to the data bus. Those of skill in the art will appreciate that the components of the wireless device 302 may be coupled together or accept or provide inputs to each other using some other mechanism.

Although a number of separate components are illustrated in FIG. 3, those of skill in the art will recognize that one or more of the components may be combined or commonly implemented. For example, the processor 304 may be used to implement not only the functionality described above with respect to the processor 304, but also to implement the functionality described above with respect to the signal detector 318 and/or the DSP 320. Further, each of the components illustrated in FIG. 3 may be implemented using a plurality of separate elements.

The wireless device 302 may comprise an access point 110, a wireless access terminal 115, and a wireless access terminal 120, and may be used to transmit and/or receive communications. That is, any of access point 110, wireless access terminals 115, and wireless access terminals 120 may serve as transmitter or receiver devices. Certain aspects contemplate signal detector 318 being used by software running on memory 306 and processor 304 to detect the presence of a transmitter or receiver.

Figure 4:
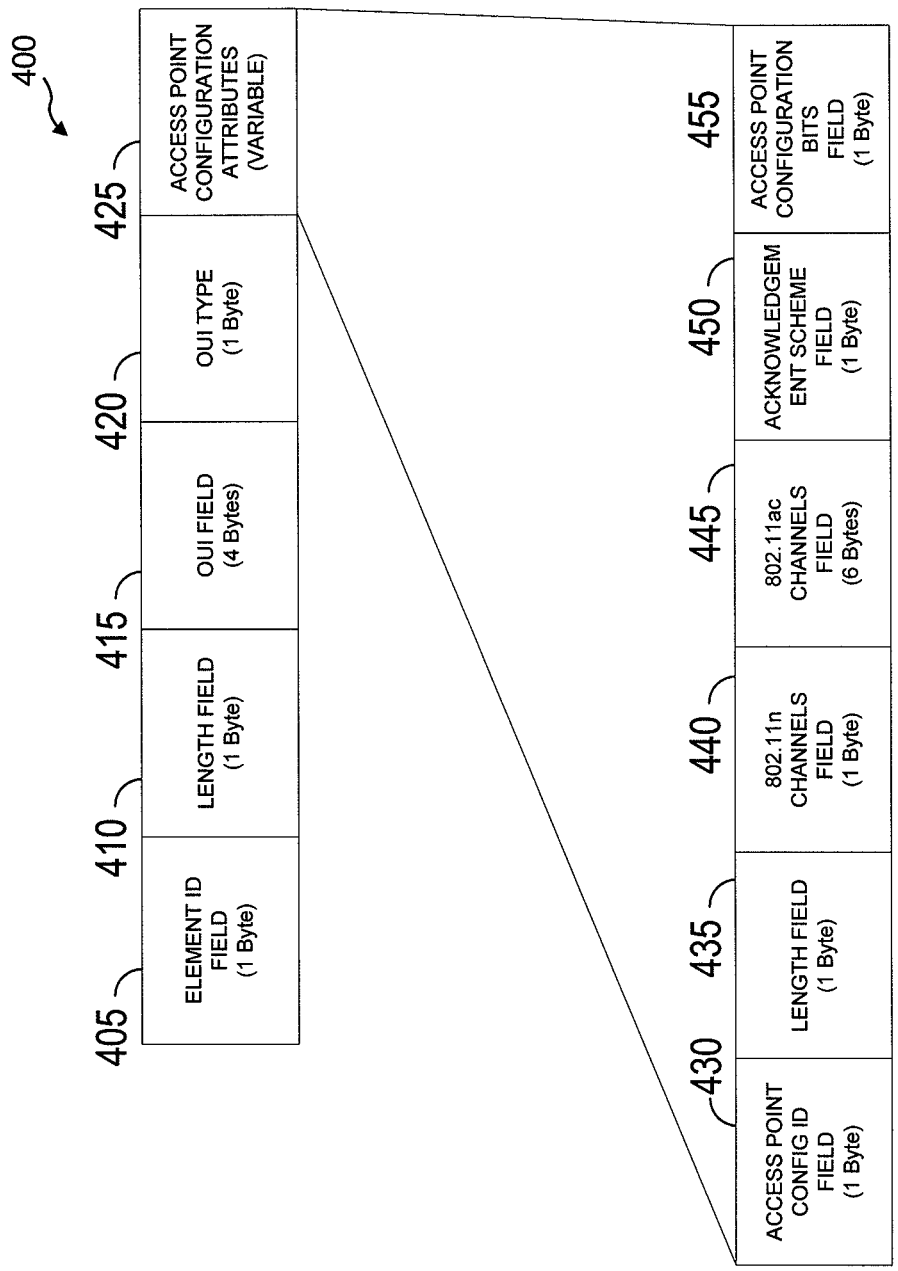
FIG. 4 illustrates an aspect of the structure of a message which may be used to communicate information between two or more devices of FIG. 1.

FIG. 4 illustrates an aspect of the structure of a message which may be used to communicate communication settings between devices of FIG. 1, specifically the access points 110 and the wireless access terminals 115 AND 120. However, in some aspects, messages of this or similar structure may be used to communicate criterion and associated information between wireless access terminals 115 and 120 and access point 110. FIG. 4 shows an aspect of a communications settings information element (IE) 400 for communicating attributes of the wireless access terminals 115 and 120 to another wireless access terminal 115 or 120 or the access point 110 or vice versa. Those skilled in the art will appreciate that the communication settings IE 400 may have more or fewer components than illustrated in FIG. 4. As shown, the communication settings IE 400 includes a sampling of elements useful for describing some prominent features of implementations within the scope of the claims and may include one or more additional fields that are not shown or may include one or more fields that may not be utilized in all aspects. The communication settings IE 400 includes an element ID field 405, which may be 1 byte in length, for example, and may include an integer value identifying the specific communication settings IE 400. The communication settings IE 400 may further include a length field 410, which may also be 1 byte in length, and which may include an integer value indicating the length, in octets, of the following fields in the communication settings IE 400. The value of the communication settings IE 400 length field as depicted, for example, may be 4 plus the total length of the RSSI attributes 425. The communication settings IE 400 may further include an organizationally unique identifier (OUI) field 415, which may be 3 bytes in length, and may include an integer value representing a Wi-Fi Alliance (WFA) or vendor specific OUI. The communication settings IE 400 may further include an OUI type field 420, which may be 1 byte in length, and may include a value identifying the type and/or version of the communication settings IE 400. The communication settings IE 400 may further include an access point configuration attributes field 425, which may be of variable length and may contain access point configuration attributes therein.

As shown in FIG. 4, access point configuration attributes field 425, which may be contained within communication settings IE 400, may include access point configuration ID field 430, which may be 1 byte in length, which may contain a value of "1" indicating the type of access point configuration attributes being a communication settings attribute. The access point configuration attribute field 425 may also include a length field 435 of 1 byte, which may include an integer value indicating the length of the fields following in the attribute. The access point configuration attribute field 425 may include an 802.11n channels field 340 of 1 byte which may indicate the channel or channels that make up the BSS1 210A for communicating with 802.11n wireless access terminals 115. The 802.11ac channels field 445 may be of 1 byte in length and may contain identifying information for the channel or channels that make up the BSS2 210B for communicating with 802.11ac wireless access terminals 120. The access point configuration attribute field 425 may also include an acknowledgement scheme field 450 of length 1 byte which may include the acknowledgement scheme of the access point 110. This acknowledgement scheme field may comprise an indicator to the receiving wireless access terminal 115 and 120 whether or not it should submit an acknowledgement automatically or wait for a beacon acknowledge request signal from the access point 110 and/or an amount of delay before transmitting an acknowledgement signal to the access point 110 after receipt of the transmission from the access point 110. For example, if the acknowledgement scheme field 450 comprises a non-zero value, then the receiving wireless access terminal 115 or 120 may know that it should submit an acknowledgement automatically after a time equal to the value in the acknowledgement scheme field 450. If the value in acknowledgement scheme field 450 is zero, then the wireless access terminal 115 or 120 may determine that it should await a beacon acknowledge request from the access point 110 before submitting the acknowledgement. The communication settings attribute field 425 may also include an access point configuration bits field 455 of length 1 byte, which may include individual bits that may be used to indicating the configuration values of the access point 110, for example a simultaneous transmit/receive bit 456 indicating the access point 110 is capable of simultaneously transmitting information on one of BSS1 210A or BSS2 210B and receiving information on the other of BSS1 210A or BSS2 210B.

As discussed briefly above, a communication from the access point 110 may comprise information regarding the access point 110 and the communication configurations allowing the access point 110 to communicate simultaneously with 802.11n and 802.11ac wireless access terminals 115 and 120. Accordingly, communication settings IE 400 as described above may include the information regarding access point 110 configuration and communication protocols and settings. The access point configuration attributes 425 may be expanded to include additional channel fields to identify additional channels that may be used for additional "virtual" BSS 210 as may be accommodated by the access point 110. For example, in some aspects, the access point 110 may be capable of supporting more than the four 20 MHz channels making up the 802.11ac band, and thus may be capable of supporting more than an 802.11ac and an 802.11n BSS 210A and 210B. In such an aspect, additional fields similar to 802.11n channels field 440 and 802.11ac channels field 445 may be included in the access point configuration variable to indicate on which channels any additional BSS 210 may operate.

Figure 5:
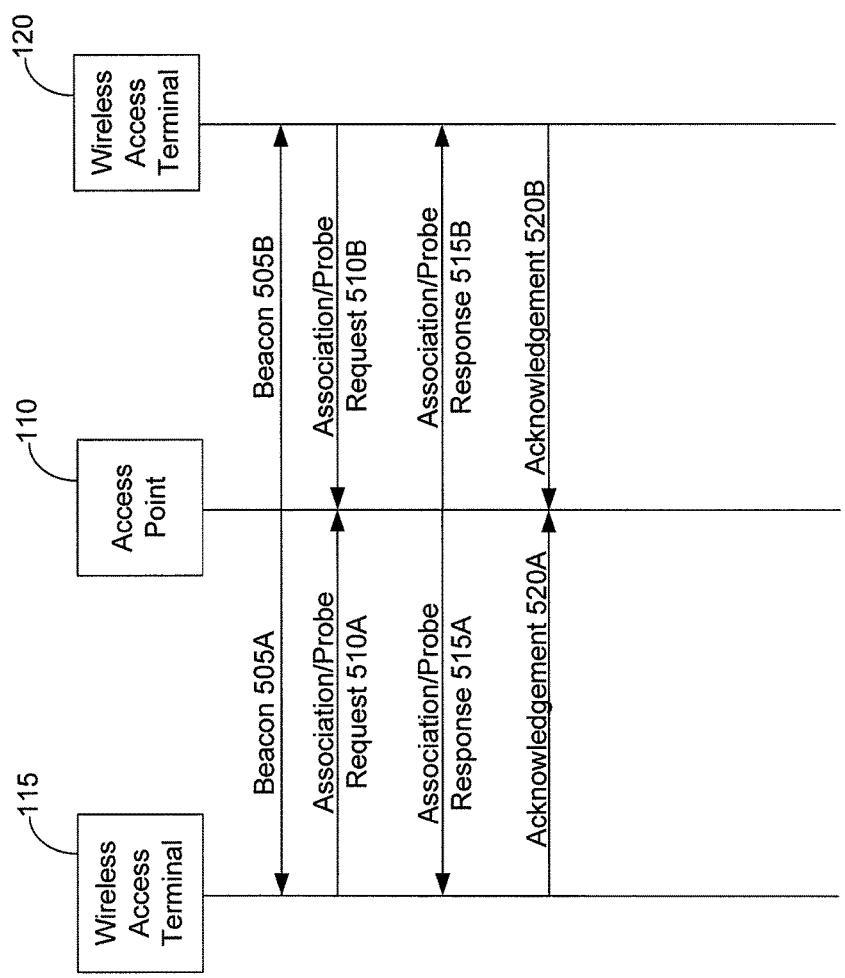
FIG. 5 illustrates a plurality of messages transmitted by an access point to wireless access terminals in the wireless communication system of FIG. 1.

FIG. 5 illustrates the communications exchanged between a wireless access terminals 115 and 120 and the access point 110. FIG. 5 is a call flow diagram of a method for the access point 110 to communicate to wireless access terminals 115 and 120 within the basic service area 105 of the access point 110 that the access point 110 is capable of both 802.11n and 802.11ac communications at the same time. Wireless access terminals 115 may correspond to the 802.11n wireless access terminals 115A-115D discussed above. Wireless access terminals 120 may correspond to the 802.11ac wireless access terminals 120A-120C discussed above.

In one aspect, the access point 110 may generate and broadcast a beacon 505A and 505B to each of the wireless access terminals 115 and 120. In some aspects, the beacons 505A and 505B may comprise information regarding the access point 110 capability of simultaneously transmitting information and receiving information. In some other aspects, the beacons 505A and 505B may comprise information regarding the access point 110 capability of simultaneously transmitting and receiving information. Additionally, the beacons 505A and 505B may comprise additional information such as details necessary for communication on the BSS1 210A and BSS2 210B, i.e., paging windows, discover windows, beacon acknowledge schemes, etc.

After receiving beacon 505A, wireless access terminal 115 may generate and transmit an association/probe request 510A. The association/probe request 510A may include information necessary to request the wireless access terminal 115 be allowed to associate with the access point 110. Similarly, wireless access terminal 120 may generate and transmit an association/probe request 510B, which may include information necessary to request the wireless access terminal 120 be allowed to associate with the access point 110. Accordingly, the access point 110 may respond to the association/probe requests 510 with association/probe responses 515, which may include information indicating the acceptance or rejection/denial of the association/probe requests 510. In some aspects, the access point 110 may transmit data or information to the wireless access terminals 115 and 120 in response to the association/probe requests 510 instead of association/probe responses 515. The association/probe responses 515 or data transmission 515 may be transmitted simultaneously to the wireless access terminal 115 and the wireless access terminal 120. After transmitting the association/probe responses 515 or the data transmissions 515, the access point 110 may then wait for receipt acknowledgements from each of the wireless access terminals 115 and 120. In some aspects, if the transmissions 515 to wireless access terminals 115 and 120 ended at the same time, then the access point 110 may wait for receipt acknowledgement from the two wireless access terminals 115 and 120, assuming the access point is capable of simultaneous reception of signals, and the wireless access terminals 115 and 120 may transmit the acknowledgements 520A and 520, respectively, after a PIFS time. In another aspect where the transmissions 515 to wireless access terminals 115 and 120 ended at the same time but the access point 110 is unable to receive acknowledgements at the same time, the access point may indicate in the IE 400 that the receiving wireless access terminals 115 and 120 should not transmit acknowledgments to the access point 110 until the wireless access terminals 115 and 120 receive a beacon acknowledge request signal (not shown in this figure) from the access point 110.

Figure 6:
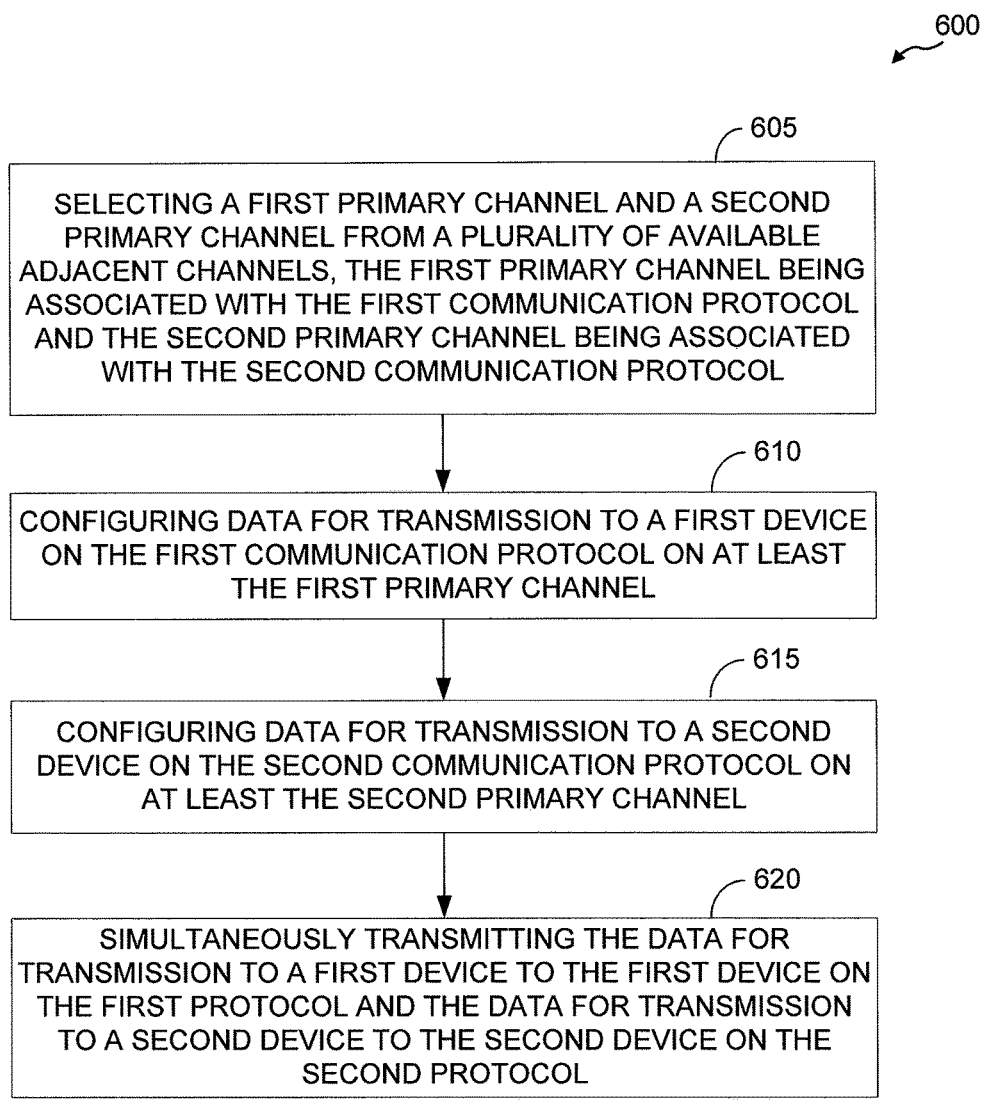
FIG. 6 represents a flowchart of a method for generating a dual primary channel access point configuration.

Referring to FIG. 6, a flowchart is depicted illustrating one exemplary method of wireless communication. In some aspects, the method 600 may be performed by the wireless device 302, shown above with respect to FIG. 3. In some aspects, method 600 may be performed by the access point 110 or the wireless access terminals 115 and/or 120.

The method 600 may begin with block 605, where the method may begin by selecting a first primary channel and a second primary channel from a plurality of channels, the first primary channel being associated with a first communication protocol and the second primary channel being associated with a second communication protocol. The selection of the first and second primary channel may be performed by the processor 304 or the user interface 322. As discussed above, the selection of the first and second primary channels may comprise selecting from any of the plurality of channels that make up the original band of the access point 110.

Block 610 may comprise configuring data for transmission to a first device on the first communication protocol on at least the first primary channel. In some aspects, the data may be configured to be transmitted on the first primary channel and a first secondary channel. This may be configuring data destined for an 802.11n wireless access terminal 115 in a format that the 802.11n wireless access terminal 115 will be able to receive and understand the received data. Block 615 may comprise configuring data for transmission to a second device on the second communication protocol on at least the second primary channel. In some aspects, the data may be configured to be transmitted on the second primary channel and a second secondary channel. This may comprise configuring data destined for an 802.11ac wireless access terminal 120 in a format that the 802.11ac wireless access terminal 120 will be able to receive and understand the received data.

Block 620 may comprise simultaneously transmitting the data for transmission to a first device to the first device on the first protocol and the data for transmission to a second device to the second device on the second protocol. In some aspects, the most limited or constrained communication protocol (e.g., the 802.11n protocol of the 802.11n and 802.11ac protocols) may be the "controlling" protocol, such that the transmission on the "controlling" protocol is given the priority, and the additional, simultaneous communications to the second or more communication protocols are added to the transmission to the "controlling" protocol such that they are transmitted simultaneously. Once added, the data to the first device and the data to the second device may be transmitted simultaneously on their respective protocols. For example, 802.11n may be more limited/constrained that the 802.11ac protocol because the 802.11n protocol has a more limited band to utilize (40 MHz band vs. 80 MHz band). Accordingly, the 802.11n communications will be given priority and may be the "controlling" transmissions such that the 802.11ac communication will be added to the scheduled 802.11n transmission such that they are transmitted simultaneously to their respective wireless access terminals 115 and 120.

Figure 7:
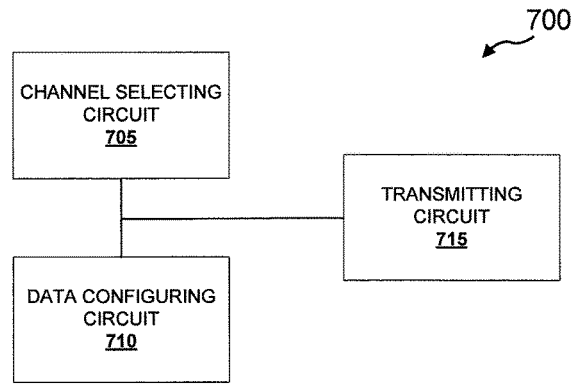
FIG. 7 is a functional block diagram of an exemplary access point that may be employed within a wireless communication system.

FIG. 7 is a functional block diagram of an access point that may be employed within the wireless communication system of FIG. 1. Those skilled in the art will appreciate that an access point may have more components than the simplified access point 700 shown in FIG. 7. The access point 700 shown includes only those components useful for describing some prominent features of implementations within the scope of the claims. The access point 700 may include a channel selecting circuit 705, a data configuring circuit 710, and a transmitting circuit 715.

In some aspects, one or more of the channel selecting circuit 705, the data configuring circuit 710, and/or the transmitting circuit 715 may be implemented within one or more of the access points 110 discussed above.

In some implementations, the channel selecting circuit 705 may be configured to perform one or more of the functions discussed above with respect to block 605. The channel selecting circuit 705 may include one or more of a programmable chip, a processor, a memory, a receiver and a network interface. For example, the channel selecting circuit 705 may include the processor 304, the user interface 322, or the memory 306. In some implementations, means for selecting a channel and/or means for performing channel selection and/or means for selecting may include the channel selecting circuit 705.

In some implementations, the data configuring circuit 710 may be configured to perform one or more functions discussed above with respect to blocks 610 and 615. The data configuring circuit 710 may include one or more of a programmable chip, a processor, a memory, a user interface, and a network interface. For example, the data configuring circuit 710 may include the processor 304, the user interface 322 and the memory 306, among others. In some implementations, means for configuring data and/or means for generating data for transmission may include the data configuring circuit 710.

In some implementations, the transmitting circuit 715 may be configured to perform one or more functions discussed above with respect to block 620. The transmitting circuit 715 may include one or more of a programmable chip, a processor, a memory, a user interface, and a network interface. For example, the transmitting circuit 715 may include the processor 304, the memory 306, transceiver 314, transmitter 312, and/or the user interface 322. In some implementations, means for transmitting to a device and means for generating for transmission may include the transmitting circuit 715.

As used herein, the term interface may refer to hardware or software configured to connect two or more devices together. For example, an interface may be a part of a processor or a bus and may be configured to allow communication of information or data between the devices. The interface may be integrated into a chip or other device. For example, in some embodiments, an interface may comprise a receiver configured to receive information or communications from a device at another device. The interface (e.g., of a processor or a bus) may receive information or data processed by a front end or another device or may process information received. In some embodiments, an interface may comprise a transmitter configured to transmit or communicate information or data to another device. Thus, the interface may transmit information or data or may prepare information or data for outputting for transmission (e.g., via a bus).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, aa, bb, cc, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. Thus, in some aspects, computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/ or encoded) thereon, the instructions being executable by one or more processors to perform the operations described herein. For certain aspects, the computer program product may include packaging material.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. An apparatus for communicating, comprising:
   a processing system configured to:
      select a first primary channel and a second primary channel from a plurality of channels, the first primary channel being associated with a first communication protocol and the second primary channel being associated with a second communication protocol;
      configure first data based on the first communication protocol; and
      configure second data based on the second communication protocol; and
   an interface associated with both a first basic service set and a second basic service set that is different from the first basic service set, the interface being configured to simultaneously output the first data for transmission to a first device of the first basic service set and the second data for transmission to a second device of the second basic service set,
   wherein the processing system is further configured to simultaneously receive a first acknowledgement from the first device and a second acknowledgement from the second device, and wherein the first acknowledgement is configured to indicate receipt of the first data by the first device and the second acknowledgement is configured to indicate receipt of the second data by the second device.

2. The apparatus of claim 1, wherein the selection of the first primary channel and the second primary channel is based at least in part on whether each of the first primary channel and the second primary channel has an adjacent channel from the plurality of channels capable of being designated as a first secondary channel and a second secondary channel, respectively, and wherein the processing system is further configured to:
   designate the adjacent channel for the first primary channel as the first secondary channel; and
   designate the adjacent channel for the second primary channel as the second secondary channel.

3. The apparatus of claim 1, wherein the processing system is further configured to simultaneously advertise the first basic service set and the second basic service set, the first basic service set comprising the first primary channel and a first secondary channel adjacent to the first primary channel and the second basic service set comprising the second primary channel and a second secondary channel adjacent to the second primary channel, wherein the first basic service set supports communications with the first device and wherein the second basic service set supports communications with the second device.

4. The apparatus of claim 1, wherein the plurality of channels comprise a first 20 MHz channel, a second 20 MHz channel, a third 20 MHz channel, and a fourth 20 MHz channel, each of the first 20 MHz channel, the second 20 MHz channel, the third 20 MHz channel, and the fourth 20 MHz channel being adjacent to each other, and wherein the first primary channel and a first secondary channel are configured to be one of the first 20 MHz channel and the second 20 MHz channel, or the third 20 MHz channel and the fourth 20 MHz channel, respectively, and wherein the second primary channel and a second secondary channel are configured to be the other of the first 20 MHz channel and the second 20 MHz channel, or the third 20 MHz channel and the fourth 20 MHz channel, respectively.

5. The apparatus of claim 1, wherein the first primary channel and a first secondary channel form a 40 MHz band capable of supporting communications with the first device, and wherein the interface is further configured to output the first data for transmission to the first device on the 40 MHz band.

6. The apparatus of claim 1, wherein the second primary channel and a second secondary channel form a 40 MHz band capable of supporting communications with the second device, and wherein the interface is further configured to output the second data for transmission to the second device on the 40 MHz band.

7. The apparatus of claim 1, wherein the processing system is further configured to generate a first beacon for transmission on the first primary channel and generate a second beacon for transmission on the second primary channel, and wherein the interface is further configured to output the first beacon for transmission to the first device and the second beacon for transmission to the second device.

8. The apparatus of claim 1, wherein the processing system is further configured to generate a first beacon for transmission on the first primary channel and a first secondary channel and generate a second beacon for transmission on the second primary channel and a second secondary channel, and wherein the first beacon and the second beacon are identical in length but comprise at least one of different information or different fields, and wherein the interface is further configured to output the first beacon for transmission to the first device and the second beacon for transmission to the second device.

9. The apparatus of claim 8, wherein the interface is further configured to simultaneously output the first beacon and the second beacon for transmission.

10. The apparatus of claim 1, wherein the processing system is further configured to generate a first beacon advertising a first basic service set and generate a second beacon advertising a second basic service set, wherein the interface is further configured to simultaneously output the first beacon for transmission on the first primary channel and the second beacon for transmission on the second primary channel, and wherein the first basic service set comprises the first primary channel and a first secondary channel adjacent to the first primary channel and the second basic service set comprises the second primary channel and a second secondary channel adjacent to the second primary channel.

11. The apparatus of claim 1, wherein the apparatus is capable of communicating with the first device using the second communication protocol.

12. A method for communicating by an apparatus associated with both a first basic service set and a second basic service set that is different from the first basic service set, comprising:
selecting a first primary channel and a second primary channel from a plurality of channels, the first primary channel being associated with a first communication protocol and the second primary channel being associated with a second communication protocol;
outputting first data for transmission to a first device of the first basic service set based on the first communication protocol on at least the first primary channel;
outputting second data for transmission to a second device of the second basic service set based on the second communication protocol on at least the second primary channel, wherein the first data and the second data are simultaneously outputted for transmission; and
simultaneously receiving a first acknowledgement from the first device and a second acknowledgement from the second device, wherein the first acknowledgement is configured to indicate receipt of the first data by the first device and the second acknowledgement is configured to indicate receipt of the second data by the second device.

13. The method of claim 12, wherein the selection of the first primary channel and the second primary channel is based at least in part on whether each of the first primary channel and the second primary channel has an adjacent channel from the plurality of channels capable of being designated as a first secondary channel and a second secondary channel, respectively, and further comprising:
designating the adjacent channel for the first primary channel as the first secondary channel; and
designating the adjacent channel for the second primary channel as the second secondary channel.

14. The method of claim 12, further comprising simultaneously outputting the first basic service set and the second basic service set for transmission, the first basic service set comprising the first primary channel and a first secondary channel adjacent to the first primary channel and the second basic service set comprising the second primary channel and a second secondary channel adjacent to the second primary channel, wherein the first basic service set supports communications with the first device and wherein the second basic service set supports communications with the second device.

15. The method of claim 12, further comprising:
generating a first beacon;
outputting the first beacon for transmission on the first primary channel to the first device;
generating a second beacon; and
outputting the second beacon for transmission on the second primary channel to the second device.

16. The method of claim 12, further comprising:
generating a first beacon;
outputting the first beacon for transmission on the first primary channel and a first secondary channel to the first device;
generating a second beacon; and
outputting the second beacon for transmission on the second primary channel and a second secondary channel to the second device,
wherein the first beacon and the second beacon are identical in length but comprise at least one of different information or different fields.

17. The method of claim 12, further comprising:
generating a first beacon advertising a first basic service set;
generating a second beacon advertising a second basic service set; and
simultaneously outputting the first beacon for transmission on the first primary channel and the second beacon for transmission on the second primary channel,
wherein the first basic service set comprises the first primary channel and a first secondary channel adjacent to the first primary channel and the second basic service set comprises the second primary channel and a second secondary channel adjacent to the second primary channel.

18. A wireless node for wireless communication, comprising:
a processing system configured to:
select a first primary channel and a second primary channel from a plurality of channels, the first primary channel being associated with a first communication protocol and the second primary channel being associated with a second communication protocol;
configure first data based on the first communication protocol; and
configure second data based on the second communication protocol; and
a transmitter associated with both a first basic service set and a second basic service set that is different from the first basic service set, the transmitter being configured to simultaneously transmit the first data to a first device of the first basic service set and the second data to a second device of the second basic service set,
wherein the processing system is further configured to simultaneously receive a first acknowledgement from the first device and a second acknowledgement from the second device, and wherein the first acknowledgement is configured to indicate receipt of the first data by the first device and the second acknowledgement is configured to indicate receipt of the second data by the second device.

* * * * *